United States Patent
Saber et al.

(10) Patent No.: US 7,536,052 B2
(45) Date of Patent: May 19, 2009

(54) CORNER SHARPENING OF TEXT AND LINE ART IN A SUPER RESOLUTION ANTI-ALIASING IMAGE PATH

(75) Inventors: Eli S. Saber, Webster, NY (US); Robert P. Loce, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 621 days.

(21) Appl. No.: 10/736,822

(22) Filed: Dec. 15, 2003

(65) Prior Publication Data
US 2005/0129328 A1 Jun. 16, 2005

(51) Int. Cl.
*G06K 9/62* (2006.01)
*G06K 9/40* (2006.01)

(52) U.S. Cl. .............. 382/209; 382/225; 382/263; 382/266; 382/269

(58) Field of Classification Search .......... 382/209, 382/235, 260, 263, 199, 225, 266, 269; 358/518, 358/296, 479; 346/154; 332/109
See application file for complete search history.

(56) References Cited

U.S. PATENT DOCUMENTS

| 4,437,122 | A |   | 3/1984  | Walsh et al.     | 358/166 |
|-----------|---|---|---------|------------------|---------|
| 4,847,641 | A |   | 7/1989  | Tung             | 346/154 |
| 5,184,226 | A |   | 2/1993  | Cianciosi        | 358/296 |
| 5,325,216 | A |   | 6/1994  | Au Yeung         | 358/479 |
| 5,383,036 | A |   | 1/1995  | Mailloux et al.  | 358/518 |
| 5,444,552 | A | * | 8/1995  | Smith, III       | 358/465 |
| 5,504,462 | A |   | 4/1996  | Clanciosi et al. | 332/109 |
| 5,663,893 | A | * | 9/1997  | Wampler et al.   | 716/19  |
| 5,696,954 | A | * | 12/1997 | Guttag et al.    | 712/221 |
| 6,044,178 | A | * | 3/2000  | Lin              | 382/261 |
| 6,160,923 | A | * | 12/2000 | Lawton et al.    | 382/275 |
| 6,343,152 | B1| * | 1/2002  | Chura            | 358/1.16|
| 6,642,529 | B1| * | 11/2003 | Subramanya et al.| 250/492.2|

(Continued)

OTHER PUBLICATIONS

Robert P. Loce et al., U.S. Appl. No. 09/505,875, filed Feb. 17, 2000, entitled "Loose-Gray-Scale Template Matching".

(Continued)

*Primary Examiner*—Bhavesh M Mehta
*Assistant Examiner*—John B Strege
(74) *Attorney, Agent, or Firm*—Fleit Gibbons Gutman Bongini & Bianco, P. L.

(57) ABSTRACT

A method for sharpening the corners of digital image data within an anti-aliasing image path so as to overcome corner rounding when displayed or printed. The method comprises stepping a window across the image data and comparing that windowed data to templates or performing Boolean logic and arithmetic operations on the image data. Upon determining a match or a corner detection, pixel values are substituted in the identified pixel locations to achieve a clustering of the substituted pixel values about the corner structure producing a corner-enhanced digital image. Filtering and sampling are then performed according to an anti-alias operation to the corner-enhanced image to produce an anti-aliased corner enhanced image. The data substitution will achieve a localized clustering or "ear" of toner/ink, or in the alternative for inside corners the localized clustered absence of toner/ink. The result of this clustering is a sharpening of the corners so that they display or print as intended by the bitmap.

22 Claims, 15 Drawing Sheets

U.S. PATENT DOCUMENTS

| | | | |
|---|---|---|---|
| 6,687,303 B1* | 2/2004 | Ishihara | 375/240.21 |
| 6,775,410 B1* | 8/2004 | Loce et al. | 382/209 |
| 6,834,124 B1* | 12/2004 | Lin et al. | 382/261 |
| 7,085,003 B1* | 8/2006 | Belkhir | 358/1.9 |
| 7,286,717 B2* | 10/2007 | Nomizu | 382/280 |
| 2001/0028981 A1* | 10/2001 | Okada et al. | 430/5 |
| 2004/0108998 A1* | 6/2004 | Imamura | 345/204 |
| 2004/0150710 A1* | 8/2004 | Sanger et al. | 347/251 |

OTHER PUBLICATIONS

Robert P. Loce et al., U.S. Appl. No. 09/579,089, filed May 25, 2000, entitled "Image Processing Method for Sharpening Corners of Text and Line Art".

* cited by examiner

| $x_1$ | $x_2$ | $x_3$ | $x_4$ | $x_5$ |
|---|---|---|---|---|
| $x_6$ | $x_7$ | $x_8$ | $x_9$ | $x_{10}$ |
| $x_{11}$ | $x_{12}$ | $x_{13}$ | $x_{14}$ | $x_{15}$ |
| $x_{16}$ | $x_{17}$ | $x_{18}$ | $x_{19}$ | $x_{20}$ |
| $x_{21}$ | $x_{22}$ | $x_{23}$ | $x_{24}$ | $x_{25}$ |

FIG. 6
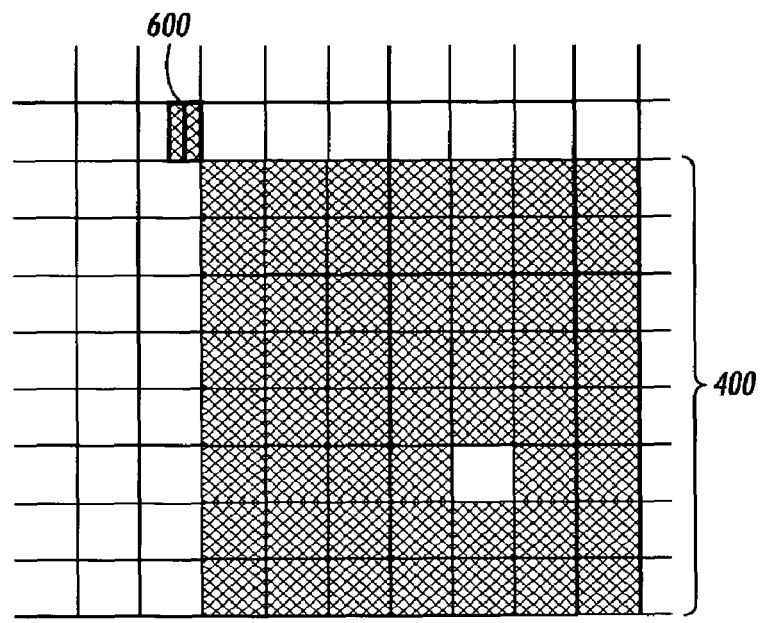
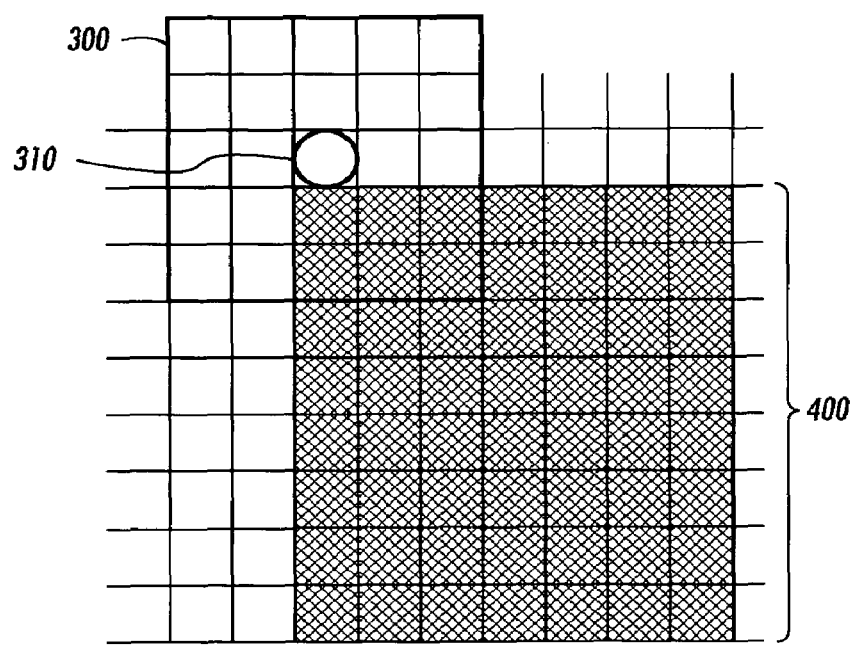
FIG. 7

CORNER SHARPENING OF TEXT AND LINE ART IN A SUPER RESOLUTION ANTI-ALIASING IMAGE PATH

CROSS-REFERENCE TO RELATED APPLICATIONS

Cross reference is made to the following applications incorporated in their entirety by reference herein for their teaching: U.S. Pat. No. 6,678,414, "LOOSE-GRAY-SCALE TEMPLATE MATCHING" to Robert P. Loce, Clara Cuciurean-Zapan and Leon Williams and U.S. Pat. No. 6,775,410, entitled "IMAGE PROCESSING METHOD FOR SHARPENING CORNERS OF TEXT AND LINE ART" to Robert P. Loce, Wei Zhu, and Clara Cuciurean-Zapan

BACKGROUND AND SUMMARY

The present disclosure relates to a methodology for improving the print quality of line-art corners and other fine details as found in both font and image data. Due to the nature of inks, paper and printing, these types of problems are well known in the printing arts.

In the printing arts this problem was typically overcome by manual image customization by hand of any troublesome detail areas. This was particularly the case with fonts or reusable type. For example, ink traps would be added to those areas in a font character where too much ink would otherwise collect and cause smearing. Similarly, detail areas would be sharpened to insure the desired print result.

This approach of compensating to get a desired result such as sharpening has followed-on from the print arts into the digital imaging arts. As an example, *Digital Typography: An Introduction to Type and Composition for Computer System Design*, by Richard Rubinstein, discusses the desirability of compensating for electrostatic effects which result in toner not being placed on the paper exactly as the bit image specifies. Compensation is depicted there as adding to the image bit map to sharpen convex (outside) corners which would otherwise get rounded over. An alternative compensation is also depicted for handling situations involving concave (inside) corners by removing black printing pixels from the corner region of a shape to make an ink trap. In FIG. 21 there is depicted the bit image data and thereby the desired print image. In FIG. 22 is depicted the rounded-over result when printed on a given printer. FIG. 23 shows the bit image compensation which when printed will yield the desired result as depicted in FIG. 21 above. Note the ears 2000 added to the outside corners and the ink trap 2010 added to address the inside corner.

In a digital image path for printing digital text and line art it is often desirable to perform anti-aliasing to better represent the contours of these image structures. Anti-aliasing refers to the use of a gray-value for a pixel to represent partial area coverage of that pixel by the edge of text or line art. Anti-aliased image structures, therefore possess gray edges. The presence of gray edges presents difficulties to image processing methods that modify text line art.

The following appear to be relevant to manipulation and enhancement of the edges of image shapes. They are incorporated by reference in their entirety for their teaching, particularly of template matching, and of bit map or signal substitution.

In U.S. Pat. No. 4,847,641 to Tung, print enhancement circuitry to enhance the printed image produced by a laser beam printer is interposed between the character generator circuits and the laser drive circuits to modify the laser drive signals provided by the character generator circuits. Bit data representing successive lines of the bit map for a desired image are stored in a first-in first-out (FIFO) buffer. The bit pattern sample window having a central cell (bit) and a selected (arbitrary) number of neighboring bits is compared to a number of matching bit patterns or templates, each of which is associated with an error element or cell. When a logic matching network detects a match, a modification signal associated with a unique compensation cell (bit) is generated. The sample window central bit is then replaced (modified) with the unique compensation bit required by the matching template. In this manner, all bits in a desired bit map, or set of bit maps, are examined and their corresponding laser drive signals modified to compensate for the errors associated with the matched templates in a piece-wise manner.

In U.S. Pat. No. 5,383,036 to Mailloux et al., a method for enhancing the contour fidelity of printed images of two or more colors is described, which includes obtaining a digital representation of the color image and finding color separations of each color. Each color separation is enhanced by a single set of inverse symmetrical templates, the set including templates in which the second template is always the inverse of the first, and the third and fourth templates are 180 degree rotations of the first two. The resulting smoothed color separations are recombined into an enhanced image without separation error.

In U.S. Pat. No. 4,437,122 to Walsh et al., presents an invention which enhances the resolution and quality of characters of a system receiving the information initially in the form of video display pixels and providing hard copy output. This is accomplished by storing at least three successive lines of video data in successive, parallel connected shift registers, applying the outputs of the shift registers to a decoder, and generating driving signals for the printer head. The decoder compares the pixels on the same line as well as in preceeding and succeeding lines that surround each specific input pixel to generate the printer head driving signals according to whether straight or curved line segments are to be formed. In effect, the printer increases the density of the information elements and simultaneously provides rounding off of character edges and smoothing of diagonals.

Therefore, there exists a need for a technique which will solve the problem of corner rounding as an automated, non-manual processing operation in an anti-aliasing image path. Thus, it would be desirable to solve this and other deficiencies and disadvantages with an automated processing methodology.

Disclosed in embodiments herein is a method of corner sharpening in the display of a bitmapped digital image. In one embodiment the corner sharpening method comprises identifying pixel locations about corner structure in a digital image and substituting pixel values in the identified pixel locations to achieve a clustering of the substituted pixel values about the corner structure; thus producing a corner-enhanced digital image Filtering and sampling according to an anti-alias operation is applied to said corner-enhanced image to produce an anti-aliased corner enhanced image.

In another embodiment a corner sharpening method comprises identifying pixel locations about corner structure in a digital image. Pixel values are substituted in the identified pixel locations to achieve a clustering of the substituted pixel values about the corner structure, producing a corner-enhanced digital image. Filtering and sampling according to an anti-alias operation is performed to said corner-enhanced image to produce an anti-aliased corner enhanced image. The sampling produces image data samples at a lower resolution, with the rendering of the lower resolution image data samples provided as suitable for driving a laser printer.

BRIEF DESCRIPTION OF THE DRAWINGS

FIG. 6 depicts the bitmap data result of a first template match.

FIG. 7 shows a window placed upon a second address in the image data bitmap.

DETAILED DESCRIPTION

It is to be understood that the disclosure of embodiments following describe a digital data technique which sharpens the corners of image data to compensate for corner rounding. It is desirable to perform such compensation because marking and imaging processes can round off corners and make font serifs short and blunt. Further, it may be desirable to sharpen such features due to human observer appearance preferences. Central to the teaching of the present disclosure is that in an anti-aliasing image path corner sharpening enhancement is to be performed prior to the anti-aliasing filtering operation.

Figure 1:
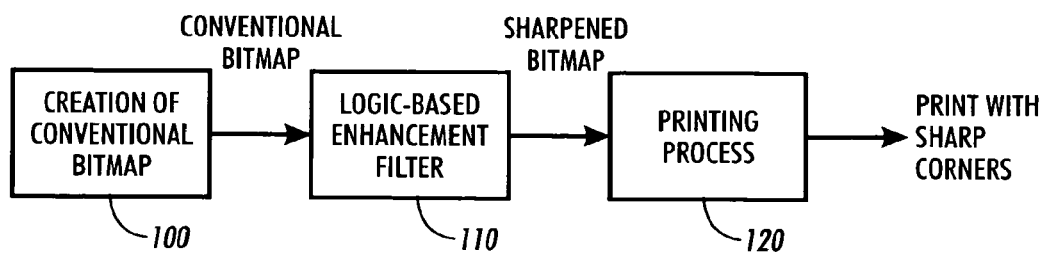
FIG. 1 depicts an overview schematic of an enhanced printing process.

In the field of scanning and printing digital images, the flow of image data and the transformations performed on the data is often referred to as the "image path." FIG. 1, depicts an embodiment of an image path that will utilize a technique as discussed below close to the point of actual print or display. In FIG. 1, block 100 shows the input of bit map digital image data into logic-based enhancement filter block 110, where the following description is performed. The output of block 110 produces a sharpened bitmap for printing process 120, or in one possible alternative a correction signal for suitably directing the printing process 120.

Figure 2:
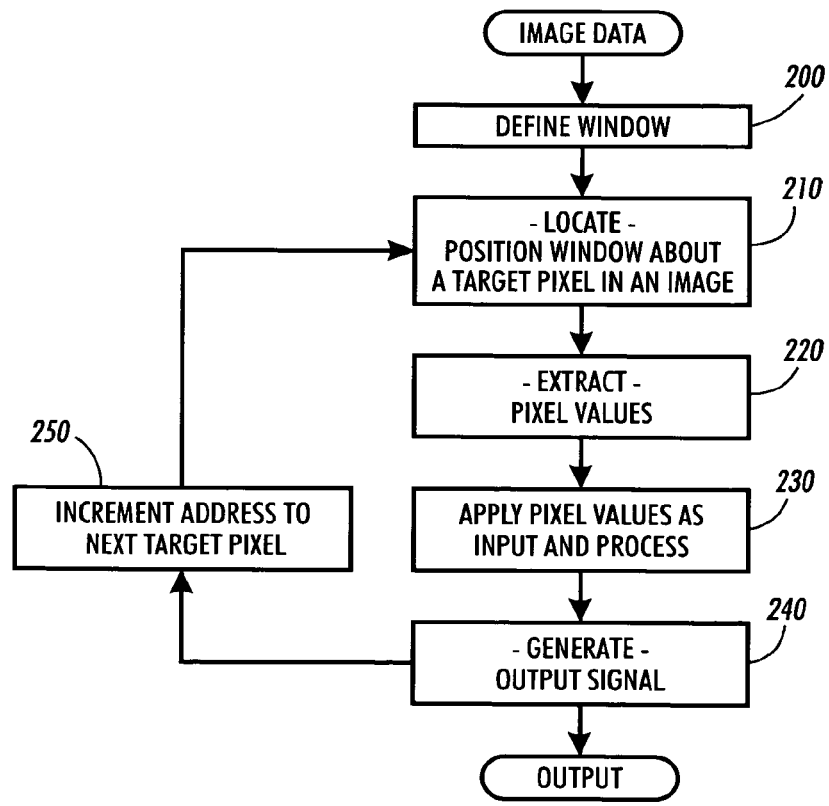
FIG. 2 depicts a flow chart of an enhanced printing process.

FIG. 2 further depicts one operational procedure as would be performed within the logic-based enhancement filter block 110 of FIG. 1. In FIG. 2, raster scan image data is supplied as input data into window definition block 200. Once this window is defined it is then positioned as centered about a target pixel within the raster scan data as shown by the locate block 210. In one embodiment, this window is 5×5 pixels in dimension with the center pixel as the window origin, where the center pixel is used to locate the window on the target pixel. However, a smaller widow such as a 3×3, or in the alternative a larger size window, or even a window of a non-square shape, is well within the contemplation of the present disclosure. This window is stepped through the image pixel data. In one embodiment the center pixel is stepped to target pixels from top to bottom and from left to right through all address locations within an image. Typically all pixels within the input image become target pixels in a successive manner. At each location the pixel values are extracted from within the window as indicated in step 220.

In step 230 the extracted pixel values are used as input into processing means. There are many approaches that may be taken here including hardwire digital compare circuits etc., as will be evident to those skilled in the art. However, in one embodiment templates stored in memory are compared against the extracted pixel values. Within certain processing environments template-based processing may provide an advantage due to its low computational complexity. Depending upon the result the generated output signals in step 240 provide altered pixel values. If there is no match between the stored templates and the extracted pixel data then there is no alteration of the signal output. Upon indication of a match to the template stored in memory, the data in the target pixel is rewritten so as to best sharpen the corner data by forming a localized cluster type structure. In the case of an outside corner, the structure has the same sense as the object being sharpened, that is, a dark outside corner would require a dark sharpening structure imposed upon a background, where dark may be for example represented as a 1 in the bit map. In the case of an inside corner, the structure has the same sense as the background, that is, a light background would require a light sharpening structure imposed upon the object, where light may be represented for example as a 0 in the bit map. It is this rewritten data which is passed on to the output. Finally, the increment block 250 restarts the process loop over at the next pixel address.

Figures 3, 4:
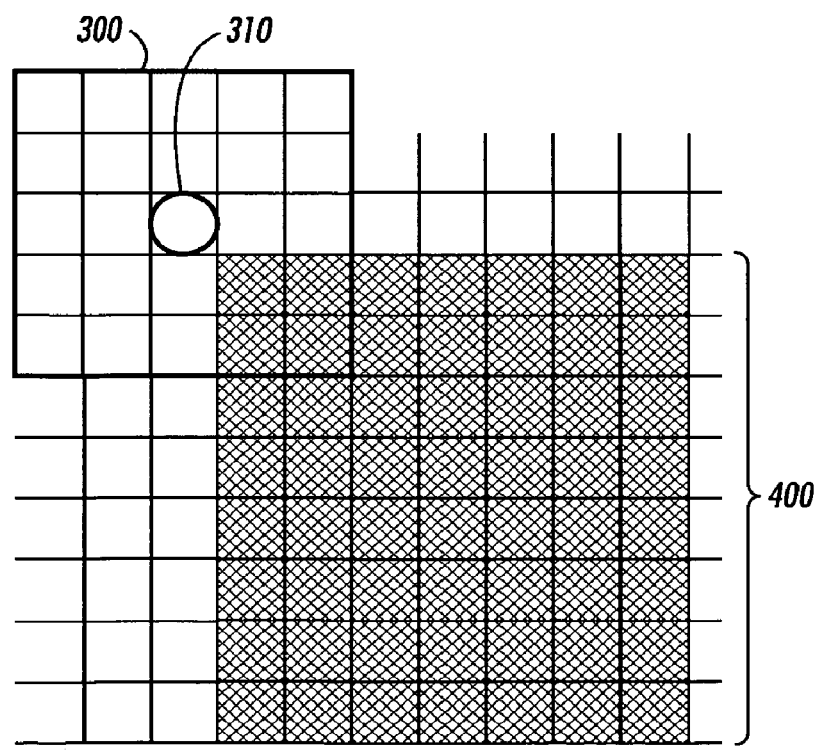
FIG. 3 shows a preferred embodiment template window.
FIG. 4 shows a window placed upon an image data bitmap.

FIG. 3 depicts a 5×5 window 300 with a center pixel 310 as the window origin, which is used in locating the window 300 about a given target pixel. A circle 311 has been added as a quick visual indicator of the origin pixel location within the window. It is this origin pixel 310 which is typically stepped across all pixel address locations as each pixel location in turn becomes a target pixel. For each pixel address, the pixel values within the window 300 are compared to a set of templates for a possible match, as described above in the prior discussion of FIG. 2. While the discussion above of FIGS. 2 and 3 describes the template matching filtering process as a serial operation, where successive target pixels are defined and processed, it will also be recognized by one skilled in the art that a parallel process could be employed where multiple target pixels could be processed simultaneously using multiple windows and multiple matching processors. The bitmap image data may be divvied-up in any number of ways in order to achieve this parallel processing of the image data. One approach would be by using segmentation to divide the image data into text and graphics for example. Another approach for color images would be to separate out the color planes and process each individually. There are many other approaches that will be apparent to those skilled in the art.

FIG. 4 shows the superimposition of window 300 upon a segment of pixel image data. Pixel locations 400 where toner is to be placed are "on" pixels and are depicted as shaded. In FIG. 4, the window origin pixel 310 has come to the first target pixel location in its scan path where the pattern of values in the window 300 will produce a match to a template. These templates are shown in FIG. 5.

Figure 5:
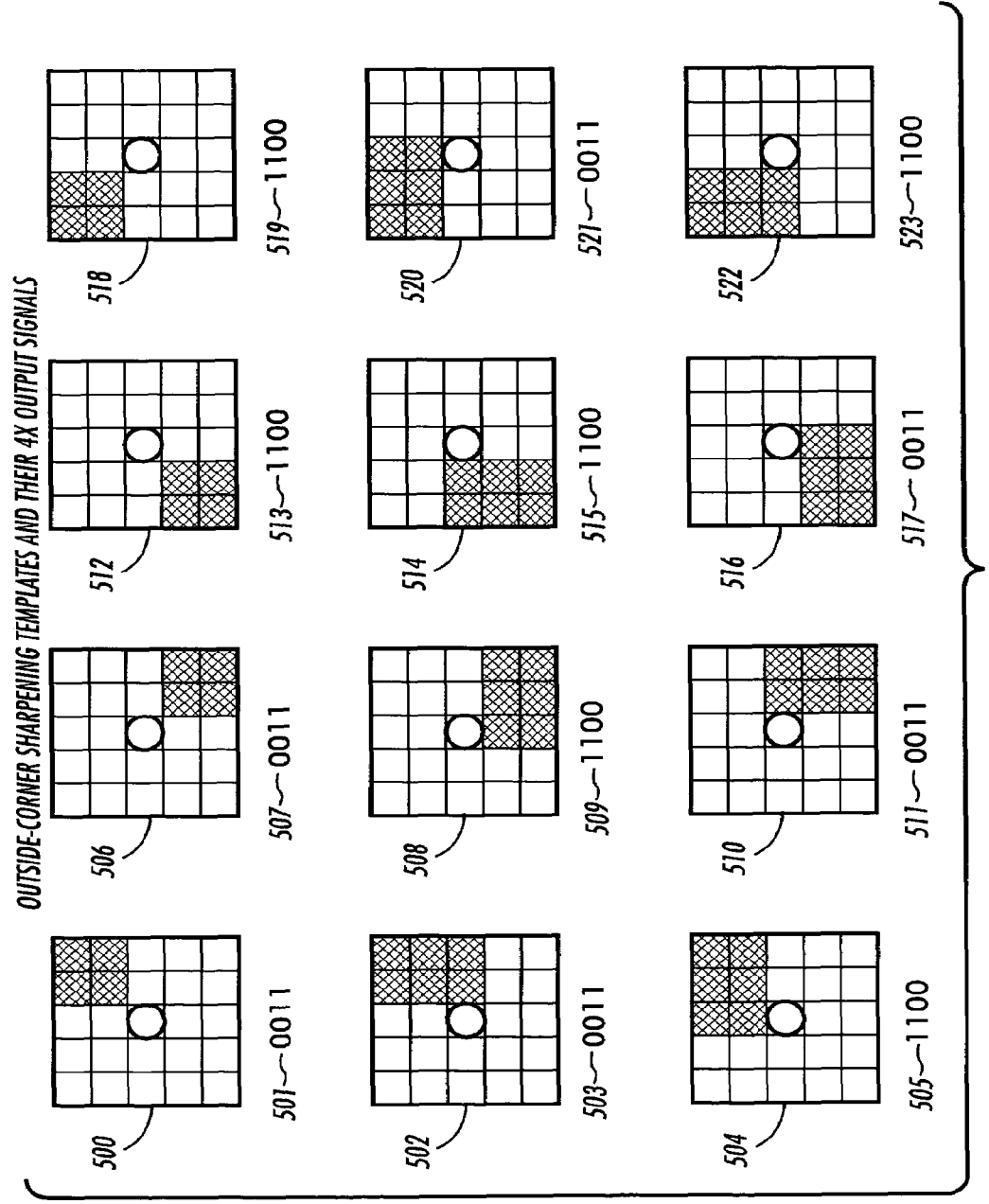
FIG. 5 shows a preferred embodiment of outside corner templates and 4× output signals.

There are 12 templates for matching as depicted in FIG. 5: templates 500, 502, 504, 506, 508, 510, 512, 514, 516, 518, 520, and 522. It is with template 506 that there is a match against the data as found in window 300 of FIG. 4. In the present example, for each of the above templates there is associated a 4× output signal code 501, 503, 505, 507, 509, 511, 513, 515, 517, 519, 521, or 523, just below it. The code in this embodiment is typically either "0011" or "1100" which is a shorthand notation for the pixel data to be substituted for the target pixel at the center window origin pixel 310 address location. The associated code in the present example for the output of template 506 is the 4× output signal code 507.

Output code 507 has as its shorthand value the representation "0011". Each digit is an "off" (zero) or "on" (one) indication for one quarter of a pixel. In other words, the first and second quarters of the target address pixel will be "off" and the third and forth quarters of the pixel will be "on" and thereby drive a writing signal to produce a darkened output. This may be achieved in one embodiment, by a 4× increase of all the data. This means that for pixel locations where there was no template match, all the original "0" value pixels now have a value assignment of "0000" and the original "1" value pixels get a "1111" data assignment. For purposes of clarity, the drawings do not show this 4× increase in data for those pixel locations with no template match. All of the 4× data is then passed to a high addressability (HA) laser system operating at four times (or more) the operational frequency then would otherwise normally be required. However, as will be apparent to one skilled in the art, other multiples besides 4× may be used, for example 1×, 1.5×, 2×, 8×etc. A description of a high addressability laser scanner is provided U.S. Pat. No. 5,325,216, incorporated by reference herein for its teaching. In an alternative approach to forming an output signal, a signal derived from the output code is sent as leading and lagging address information to a pulse width and position modulator (PWPM). PWPM techniques are well known in the art. Exemplary examples of which are provided in U.S. Pat. Nos. 5,184,226 and 5,504,462 both incorporated in their entirety by reference herein for their teaching. The result of this approach may only affect an early leading edge or late lagging edge or both; or it may create a pixel dot where none existed as described below.

In FIG. 6 we see the data result of the above substitution within the data map. The original data pixel locations 400 remain; however a half pixel 600 is added to the pixel data at that address location of the center target where the template match was made. Note that the half pixel 600 is actually comprised of two quarter pixels, and that as would be apparent to one skilled in the art other incremental divisions of a pixel, including whole pixels, could be used.

Figure 8:
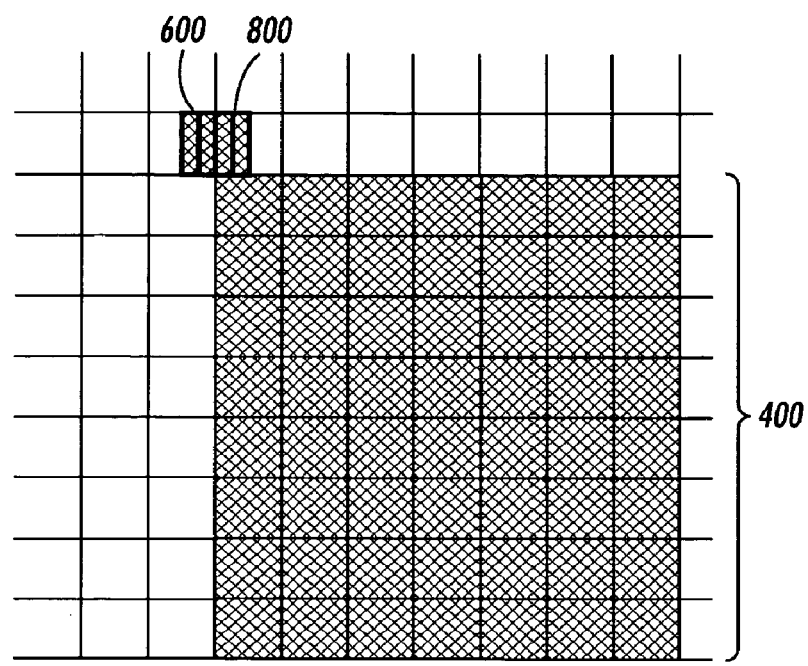
FIG. 8 depicts the bitmap data result of after a second template match.

In FIG. 7, the address for the origin pixel 310 has been incremented as per increment block 250 of FIG. 2. This has shifted window 300 one pixel to the right. Here again there is a match with a template which generates a change to the image structure. This time it is with template 508 as displayed in FIG. 5. Associated with template 508 is output code 509 "1100". FIG. 8 depicts the addition of the resultant two "on" signals or quarter pixels 800 to the data bitmap comprising original pixel locations 400, and the earlier match generated two quarter pixels 600.

Figure 9:
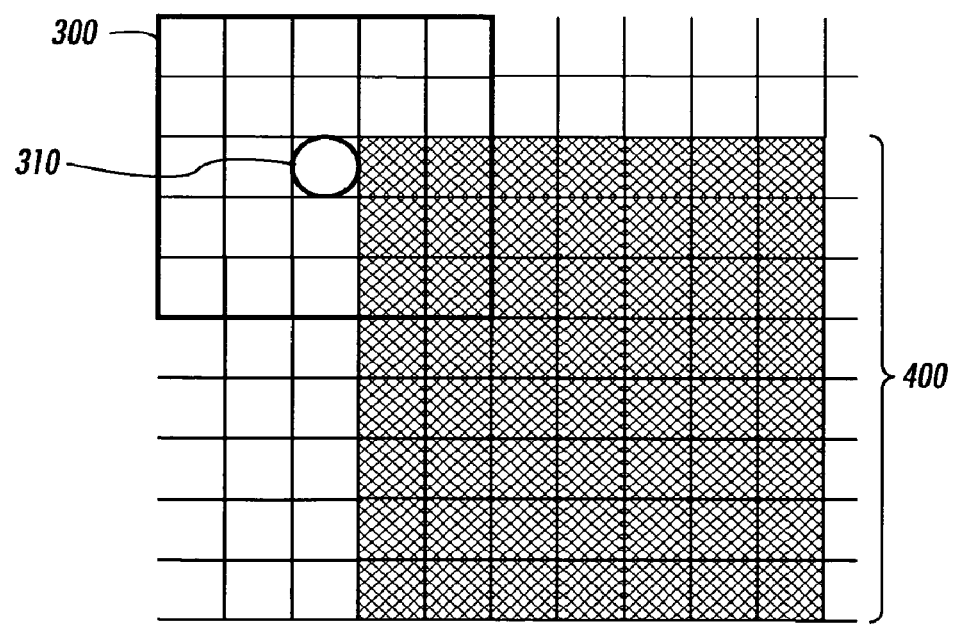
FIG. 9 shows a window placed upon a third address in the image data bitmap.
Figure 10:
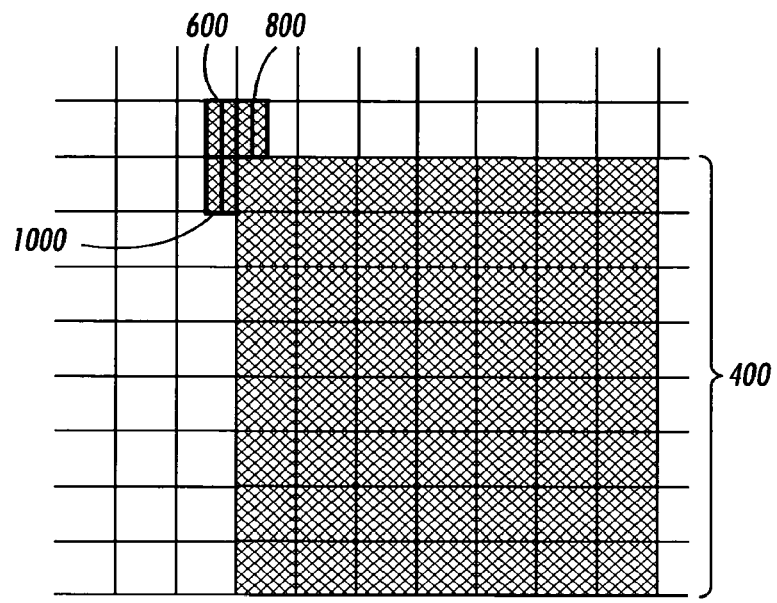
FIG. 10 depicts the bitmap data result of after a third template match.

The address for the origin pixel 310 is again and repeatedly stepped by increment block 250 across the remainder of locations in the row. For that row there are no more template matches for our example data 400. The window 300 is stepped across the next row until it comes to the location depicted in FIG. 9. Here at this location there is a template match with template 510. Utilizing the associated output code 511 "0011" yields the bit map result displayed in FIG. 10. The two quarter pixels 1000 are now in place in the bit map and in combination with the quarter pixels 600 and 800 create in this embodiment a cluster of sub-pixels about the corner of original pixel location data 400. This ear like cluster results in a sharpened appearance upon printing or display.

Figure 11:
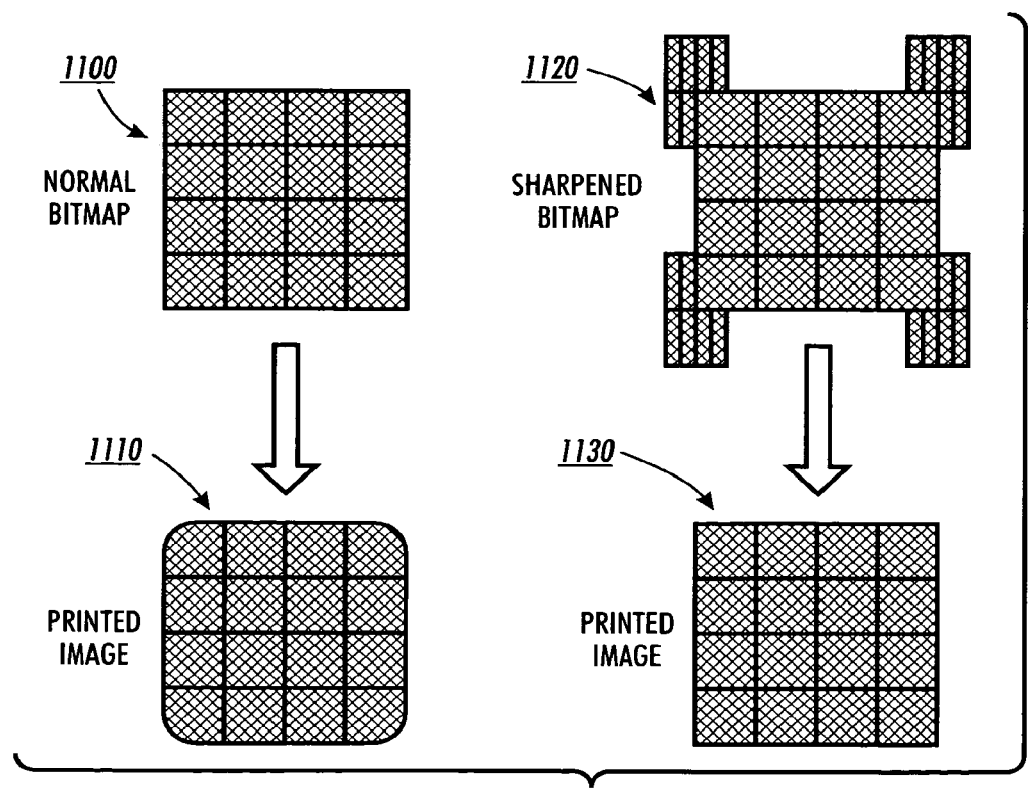
FIG. 11 shows sharpened and unsharpened bitmaps and their printed appearance.

An example utilizing all FIG. 5 templates is shown in FIG. 11. Starting with normal bitmap 1100, printed image 1110 shows how the corners get undesirably rounded off when printed. The sharpened bitmap 1120 depicts bitmap 1100 after application of the present preferred embodiment. Each corner of sharpened bitmap 1120 has been sharpened. This yields an enhanced printed image 1130 which has the original intended appearance of normal bitmap 1100. The example depicted in FIG. 11 shows right angle corners oriented normally on the page. It will be apparent to one skilled in the art that the disclosure applies to corner structure, serifs, and fine terminating points of all orientations, positions, and angles. Within the present application, we collectively refer to these image structures as corners or corner structure.

Figure 23:
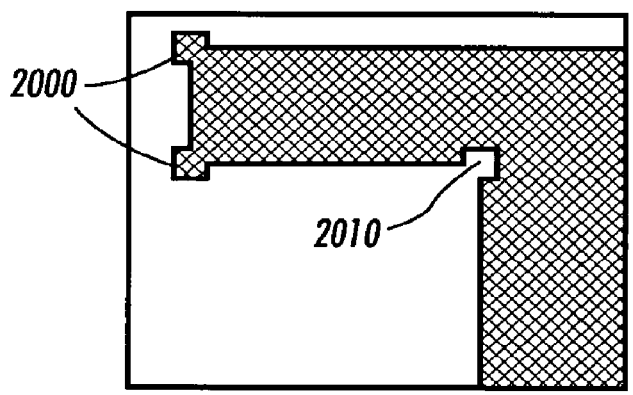

While the examples given above address sharpening of outside corners, the same techniques may be applied to sharpening inside corners to achieve an ink trap as depicted in FIG. 23. The templates of FIG. 5 are reversed. The "on" or dark pixels are made "off" or white pixels. The white "off" pixels are in turn reversed to become dark "on" pixels. Such reversed templates will now match against and identify inside corners. By also reversing the corresponding associated output codes, so as to replace "off" or white (no toner or ink) sub-pixels into the bit map, ink traps are thereby created.

Variations of the above templates and output signals may be used to achieve the desired sharpening effect for a given intended printing or display device. The templates shown in the example are useful for many xerographic marking processes. Alternative templates and output signals could identify and insert more or less structure about a corner for modification for a printing or display process as determined by its corner rendition performance, desired appearance, and the budget allowed for the modification. Please note that the final printed or displayed appearance may then be other than a truer representation of the original bit map. With application of the teachings provided herein to a particular situation, the printed or displayed corner may possess an extra tip or a notch, which could appear extra sharp. In some cases the sharpening may not be able to fully compensate for a rounding process and the result would be rounder than indicated by the input bit map.

Additional information may be used to guide the template matching process. For instance a data type indicator, or tag, may indicate that an image object is text, thereby requiring corner sharpening. Other tags could disable the matching operation. That is, the use of corner sharpening could be "tag driven" or the templates could be applied to a tag plane to generate output signals, where a window of tags would be applied to a match engine to generate an output signal.

In certain image paths it can be desirable to perform corner sharpening processing using methods other than template matching to achieve a particular system constraint, such as a low memory requirement. In such a case, a logical process, utilizing a combination of arithmetic operations and Boolean logic operations can be used. An example of such a logical process is taught below.

In the present example of an alternative processing method, the window of FIG. 3 is employed in a multistep process that utilizes serif detection, detection of simple corners, and an augmentation step, where a simple corner is here defined to be corner structure that subtends roughly 90 degrees. The first part of detection is determining if the target pixel is "on" or "off." If the target pixel is "on" the following rules are applied for serif detection and simple corner detection. If the target pixel is "off," the values of pixels in the window are inverted (1's switched to 0s and 0's switched to 1's) and then the following rules are applied to detect white serifs and inside simple corners, augmentation is performed on the inverted pixel values, and the results are inverted again and placed within the image. In this process we define the following for serif detection:

serif_threshold3×3=4/9
serif_threshold5×5=7/25
serif_threshold3=2
serif_threshold4=3
win_sum5×5=$\Sigma_{i=1,\ 25}x_i$
win_sum3×3=$x_7+x_8+x_9+x_{12}+x_{13}+X_{14}+X_{17}+X_{18}+x_{19}$
win__3×3diag45=$X_9+X_{13}+X_{17}$
win__3×3diag135=$X_7+X_{13}+X_{19}$
win__5×5diag45=$X_5+x_9+x_{13}+x_{17}+x_{21}$
win__5×5diag135=$X_1+x_7+x_{13}+x_{19}+x_{25}$
win__3×3vert=$X_8+x_{13}+X_{18}$
win__3×3horz=$X_{12}+X_{13}+X_{14}$
win__5×5vert=$X_3+X_8+X_{13}+X_{18}+X_{23}$
win__5×5horz=$X_{11}+X_{12}+X_{13}+X_{114}+X_{15}$
norm_win_sum5×5=win_sum5×5/25
norm_win_sum3×3=win_sum3×3/9
serif_detect=1(serif detected) if
norm_win_sum3×3≦serif_threshold3×3 AND
norm_win_sum5×5≦serif_threshold5×5 AND
win__3×3diag45<serif_threshold3 AND
win__3×3diag135<serif_threshold3 AND
win__3×3vert<serif_threshold3 AND
win__3×3horz<serif_threshold3 AND
Otherwise serif_detect=0
For simple corner detection, we define the following:
corner_threshold1=9/25
corner_threshold2=4/9
corner_threshold3=8/25
corner_detect=1(corner detected) if
norm_win_sum5×5≦(corner_threshold1+3)/25 AND
norm_win_sum3×3≦corner_threshold2 AND
(win__5×5diag45+win__5×5diag135)/25≦corner_threshold3
Otherwise corner_detect=0

Serif augmentation is performed if a serif is detected. Serif augmentation defines a half-vector as two pixels within a straight line within the 3×3 window and containing the origin pixel. If a half-vector is "on" and the remaining pixel in the line is "off," the remaining pixel and possibly its neighbors are given an augmentation value, for example value 128.

Corner augmentation is also performed if a serif is detected. Corner augmentation is performed by first considering "off" pixels within a 3×3 window to be candidates for value augmentation. A larger window, such as a 5×5 or 7×7 is used to determine if the candidate "off" pixels are adjacent to a neighboring image structure, such as a different typographic character. If the candidate "off" pixels are not adjacent to another structure they are assigned an augmentation value.

Further, as would be apparent to one skilled in the art, the teaching herein provided is clearly extensible into the area of grayscale image data. While the description above has stayed within simple binary image data examples, the disclosure taught may also be applied to grayscale data where a given pixel may have a shade value over a range of values between saturated black to saturated white. The above teachings on template matching methods for corner sharpening is applicable to loose grayscale template matching techniques such as those disclosed in U.S. patent application Ser. No. 09/505,875 entitled "LOOSE-GRAY-SCALE TEMPLATE MATCHING" to Robert P. Loce and Clara Cuciurean-Zapan. A gray-scale version of the above described template-matching process is especially important where the input image possesses gray edges. This image data situation is often encountered for anti-aliased data and scanned image data. We may refer to an image path with anti-aliasing of text and graphical objects as an anti-aliasing image path, and an image path that does not perform anti-aliasing as a non anti-aliasing image path. Loose gray-scale templates and the compatible matching process could be applied in an anti-aliasing image path after the anti-aliasing process.

Figure 18:
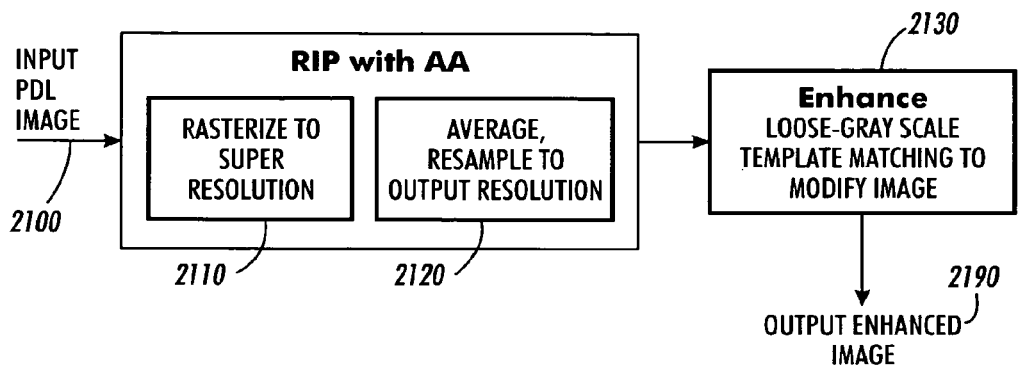
FIG. 18 shows an example of an anti-aliasing image path where the corner sharpening is performed after the anti-aliasing.

Consider the anti-aliasing image path of FIG. 18. In this example image path, a super resolution anti-aliasing method is utilized. The input image is in Page Description Language (PDL) form 2100, where fonts and graphical features are represented in functional form. Conversion to digital form is performed by a Raster Image Processing (RIP) operation. In this example of a super resolution image path, the RIP performs digitization to a higher resolution than it can output. Groups of neighboring high resolution pixels are averaged or filtered and resampled to produce the gray-edge anti-aliased pixels 2120. The averaging or filtering operation is herein referred to simply as "filtering." The gray-edged output pixels may then be enhanced (corner sharpened) using a loose-gray-scale template matching process 2130 to output a corner enhanced digital image 2140. Note that other anti-aliasing methods are within the scope of the present invention, such as filtering to produce gray using pixels using neighboring pixels that are at the output resolution.

Figure 12:
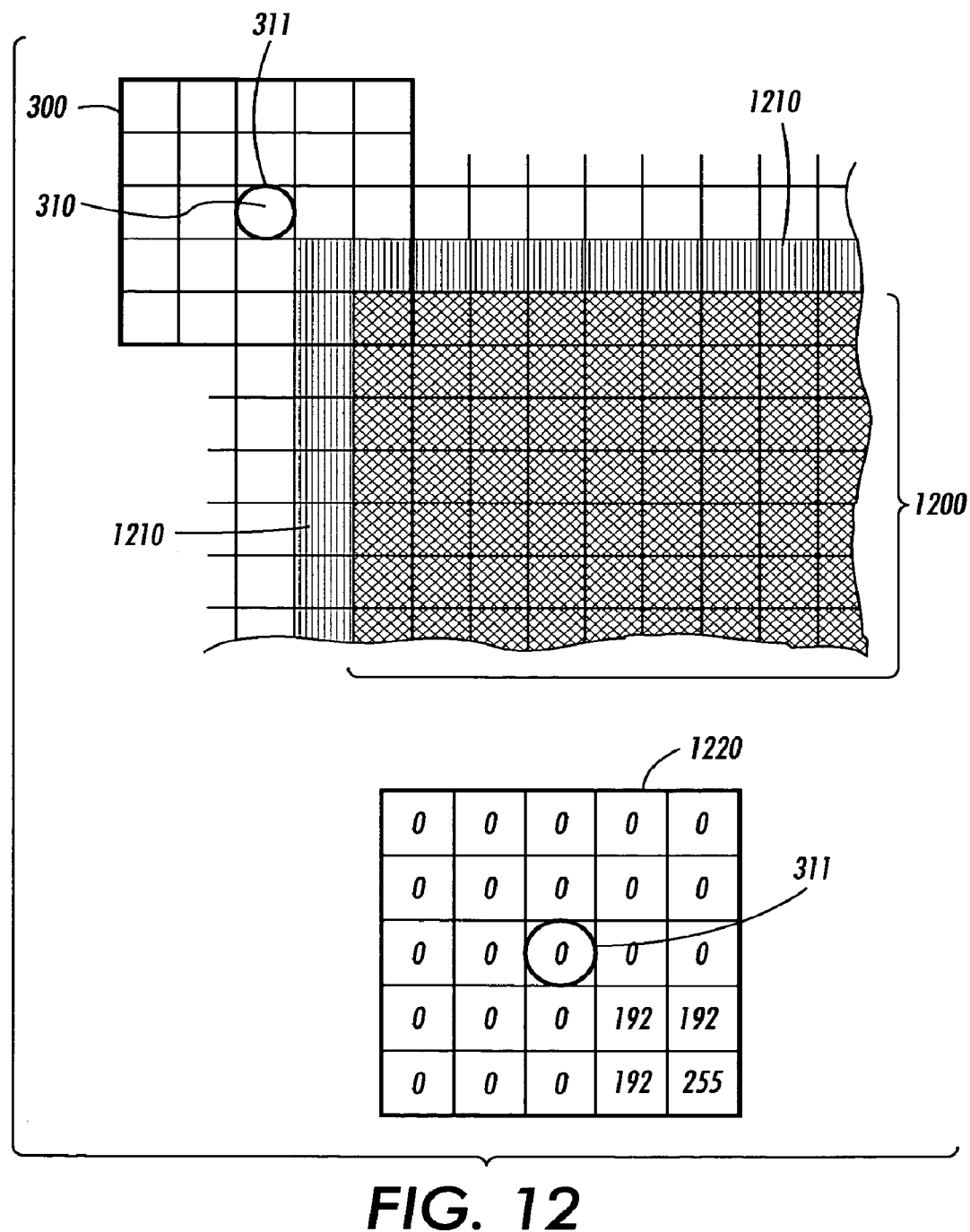
FIG. 12 shows a window placed upon a grayscale image bitmap and the corresponding matching template.

FIG. 12 shows the disclosure provided herein applied to grayscale pixel data in a preferred embodiment 5×5 window 300 with window origin pixel 310. A circle 311 is provided as a visual indicator of the origin pixel location within the window. Here we have a corner image of grayscale data where the pixels in a one embodiment may have any one of 256 grayscale values associated with it, from 0 through 255. The main bit map body 1200 of the image has pixel values of 255 and the edge pixels 1210 of the image have a grayscale level of 192. All other pixel locations in the bitmap shown in FIG. 12 have a grayscale level of zero.

The window 300 is scanned or stepped across the grayscale image data from left to right and from the top down as described above. Here in FIG. 12 the window 300 has arrived at the first target pixel location where a template match is desired. A template 1220 is depicted with the necessary pixel values for each pixel location within the template 1220 to achieve the desired match at this address location. The numerical values shown in the template 1220 consisting of "0", "192", and "255", have some grayscale looseness associated with them. This means that there is a range of pixel grayscale values as found within a bitmapped image which provides an acceptable match for each of the above numerals. The following table provides one embodiment range:

| Numerical Indicator | Range of grayscale values |
|---|---|
| 0 | 0-8 |
| 192 | 176-208 |
| 255 | 247-255 |

For example, this means that any image pixel with a grayscale value from 0 to 8 will provide a match to a template pixel when that template pixel has an assigned numerical value of "0". For all locations within the template with a numerical assignment of "0", an image pixel grayscale value of 0-8 will provide a match for that template pixel location.

Upon the successful match of template 1220 with the bitmap image data as found in FIG. 12, a new pixel grayscale value is substituted for the pixel value found at the address where origin pixel 310 is located. This will mean a substantially dark grayscale value like 255 will be placed at that location. However, as will be apparent to those skilled in the art, this value could be customized by template match (i.e bitmap location) or by another parameter, such as the pixel's original grayscale value. In that situation if the original value is white or nearly white the replacement value would be a gray value such as 192. However, if the value being replaced is gray, the replacement value would then be a dark value like 255.

Figure 13:
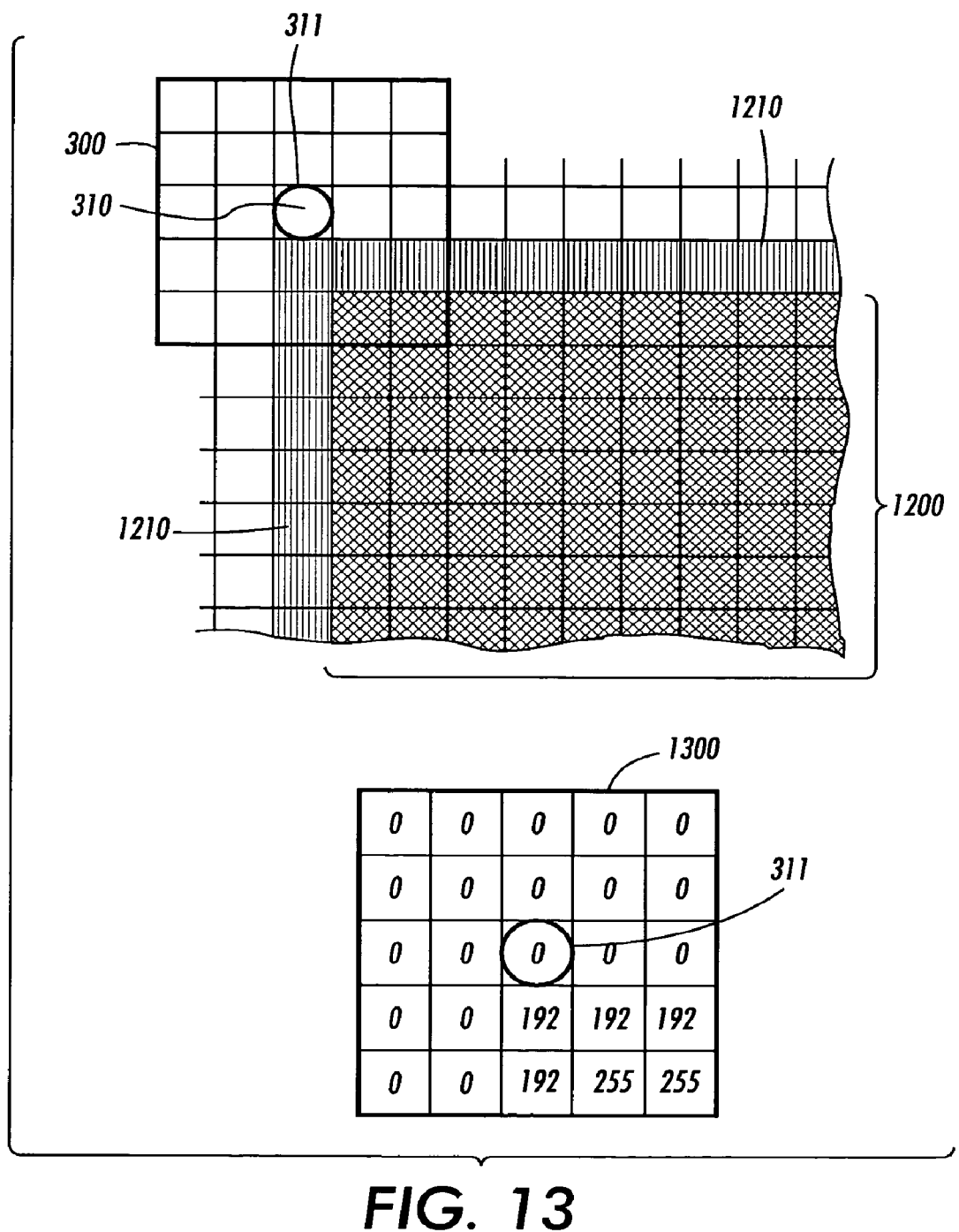
FIG. 13 shows a window placed upon a second address in the grayscale image data bitmap and the corresponding matching template.

In FIG. 13 the counter address for the location of the window 300 origin pixel 310 has been incremented by one. Here, there is another template match. The template 1300 depicts the loose grayscale values used to yield a match at this bitmap location. As discussed above, a substantially dark grayscale value like 255 will be substituted at this location for the grayscale value originally there in the bitmap.

Figure 14:
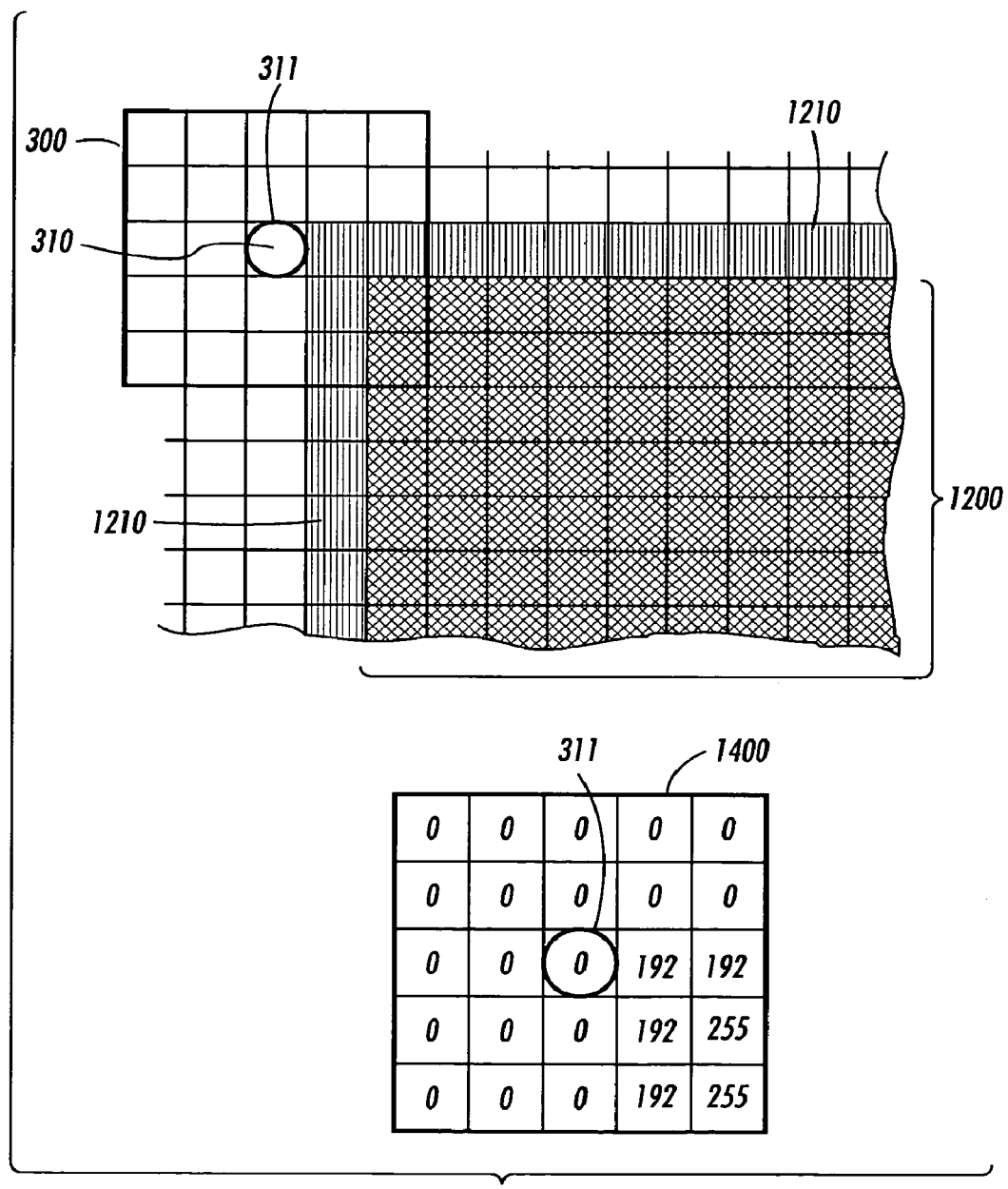
FIG. 14 shows a window placed upon a third address in the grayscale image data bitmap and the corresponding matching template.
Figure 15:
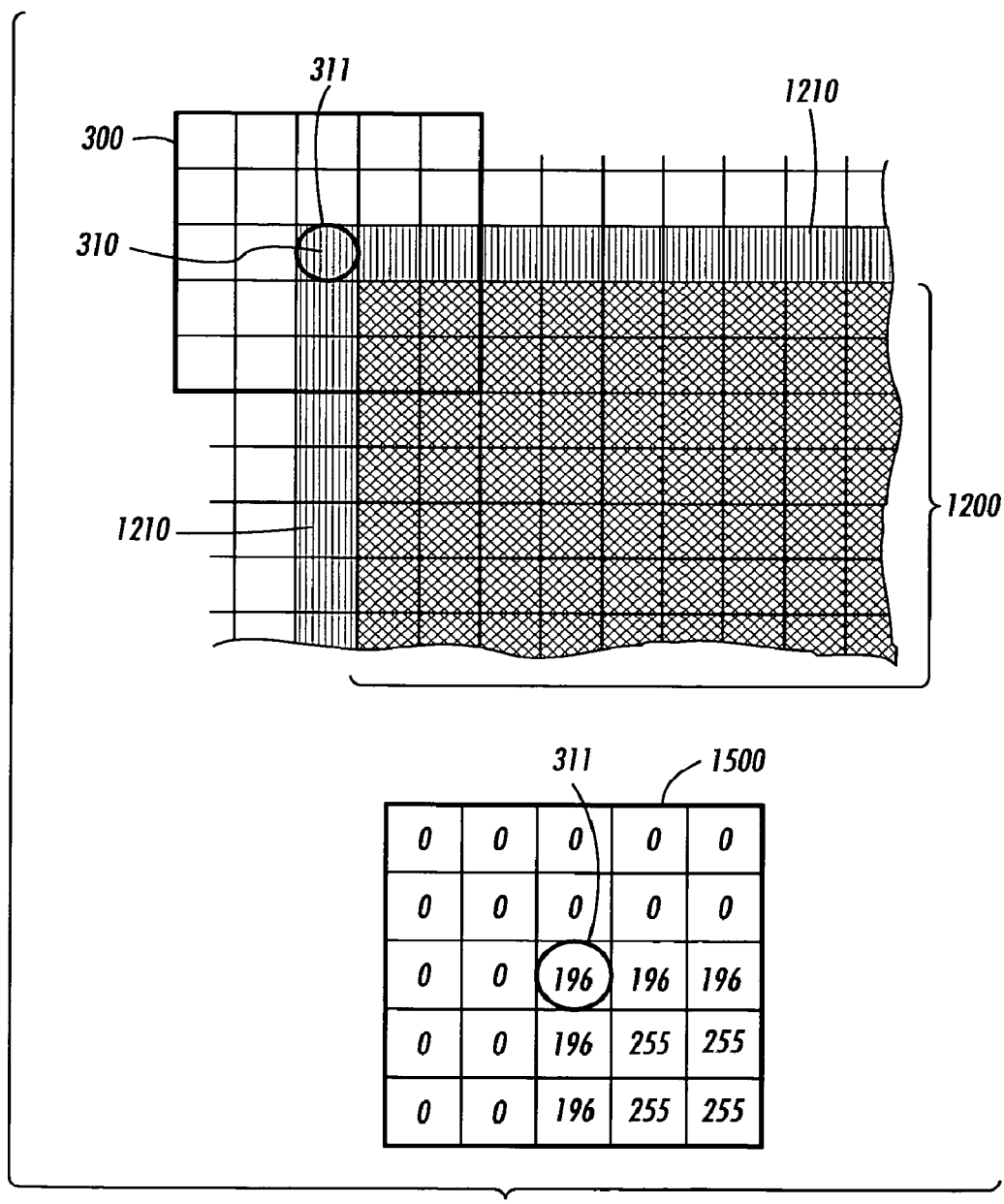
FIG. 15 shows a window placed upon a fourth address in the grayscale image data bitmap and the corresponding matching template.
Figure 16:
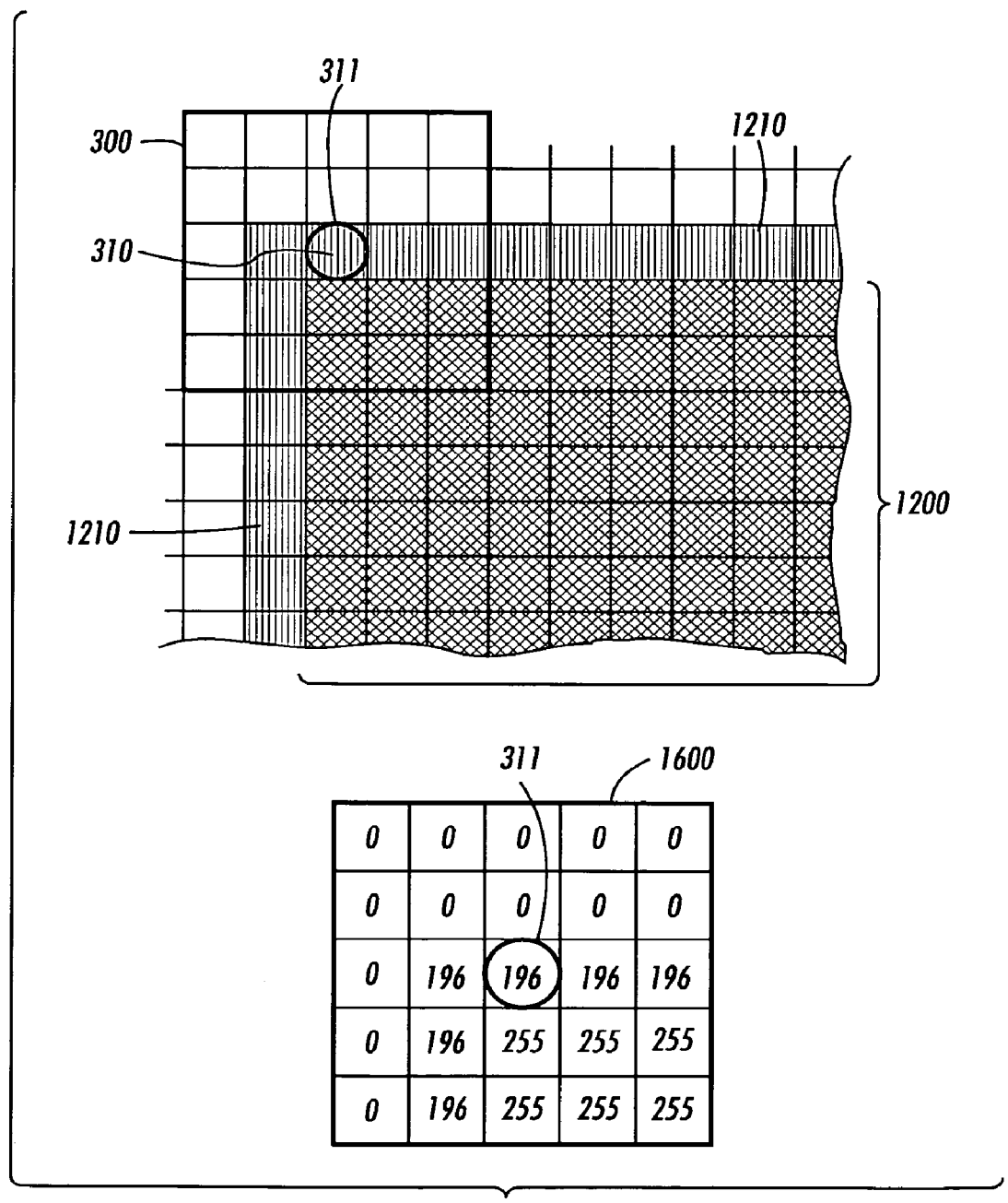
FIG. 16 shows a window placed upon a fifth address in the grayscale image data bitmap and the corresponding matching template.
Figure 17:
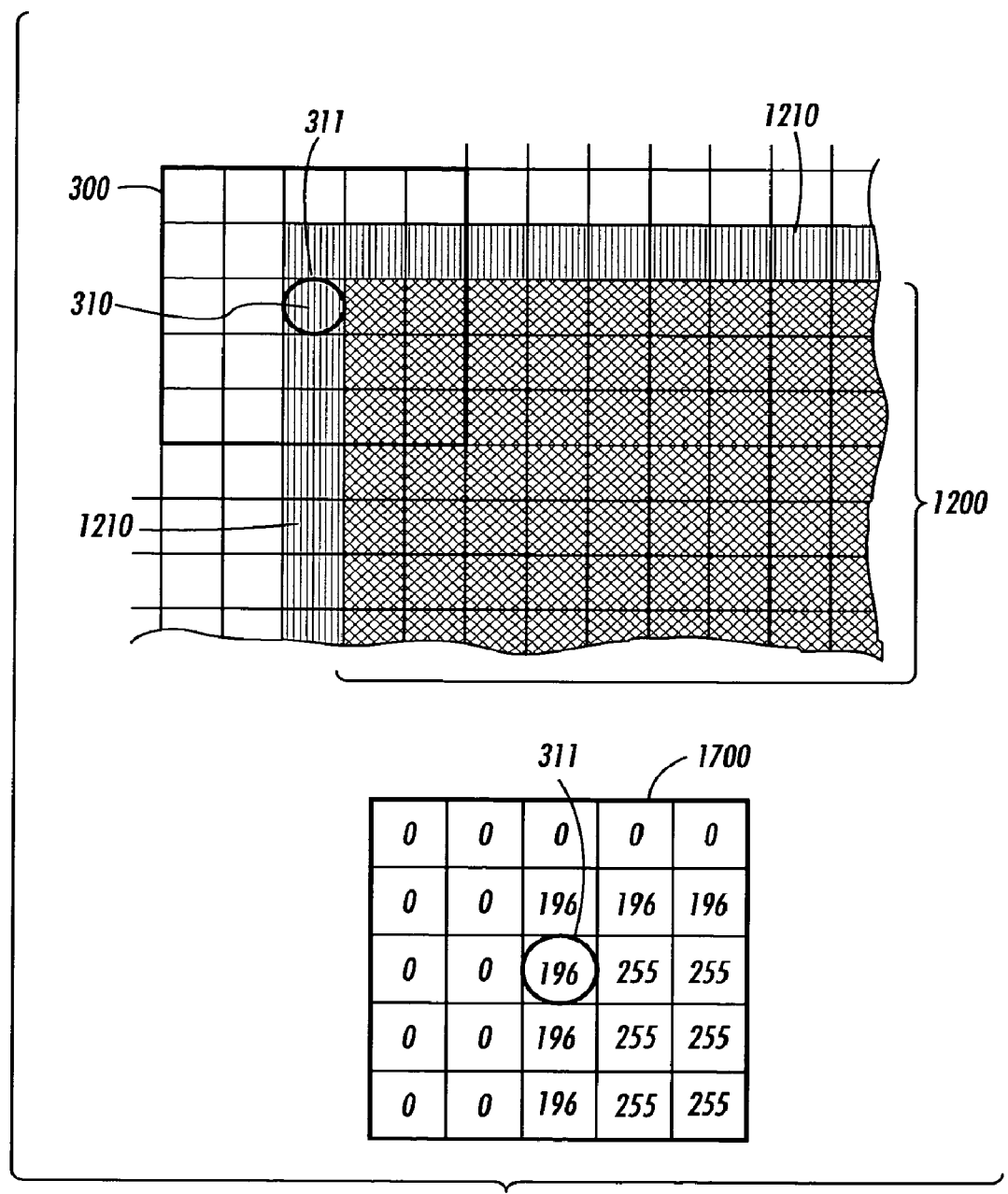
FIG. 17 shows a window placed upon a sixth address in the grayscale image data bitmap and the corresponding matching template.

FIG. 14 shows the next match to the bitmap data 1200 and 1210. The window 300 and origin pixel 310 has been stepped down one row and to the first column address location as described above to reach the next template match with template 1400. FIG. 15 shows a further match location as against template 1500 as do FIGS. 16 and 17 with templates 1600 and 1700 respectively. In each case that pixel location upon which the origin pixel is found has its data value substituted for a darker value. In total, the pixel value substitution from the matching of loose grayscale templates 1220, 1300, 1400, 1500, 1600 and 1700 will achieve a clustered "ear" of darker pixel values about the corner depicted by bitmap data 1200 and 1210. This "ear" or cluster will achieve the sharpening of corner of grayscale data in the same manner as found with the binary bitmap data 400 in FIG. 10 and as further depicted in FIG. 11. As will now be apparent to one skilled in the art similar templates are easily constructed by rotation to achieve sharpening affects upon corners in other orientations.

As will now also be apparent to one skilled in the art, inside corners in grayscale data may be sharpened with ink-traps by reversing the data polarity in the loose grayscale templates described above. This is achieved by taking the templates and changing all "0" values to become "255" and changing all "255" values to "0" values. The "192" values remain unchanged. The loose grayscale templates so arranged will find inside corners. Then by changing the data substitution at origin pixel 310 from substituting a substantially darker pixel value as discussed above, to instead substituting a more nearly white pixel value, an ink-trap is thereby achieved.

Figure 19:
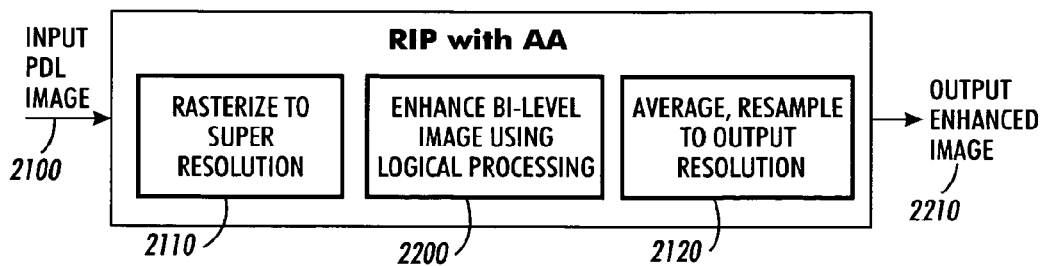
FIG. 19 shows an example of an anti-aliasing image path where the corner sharpening is performed before the anti-aliasing.

In some instantiations of an anti-aliasing image path it is desirable to perform the corner sharpening operation prior to the filtering step that produces the gray edges. For example consider the anti-aliasing image path of FIG. 19. After the rasterizing process 2110 most text and a great deal of line art is in bi-level form, such as 0/1 for an image path that utilizes binary pixels, 0/255 for an image path that uses 8 bits/pixel, or some other two-level state compatible with the image path. Enhancement processing a bi-level image possesses several advantages over processing a gray-edge instance. For instance, binary templates require less memory storage than gray-edge template. Binary processing requires lower bandwidth than gray-scale processing. And, the design process is often much simpler for binary template templates and binary logic in comparison to a gray-scale method.

Central to the teaching of the present disclosure is to perform corner sharpening enhancement in an anti-aliasing image path prior to the filtering operation. Binary template matching methods or logical processes that employ arithmetic operation and Boolean logic 2200 as described above may be applied after the rasteriztion 2110 and prior to the filtering operation 2120. The filtering operation 2120 will thus produce and output corner-enhanced image with gray edges 2210.

Figure 20:
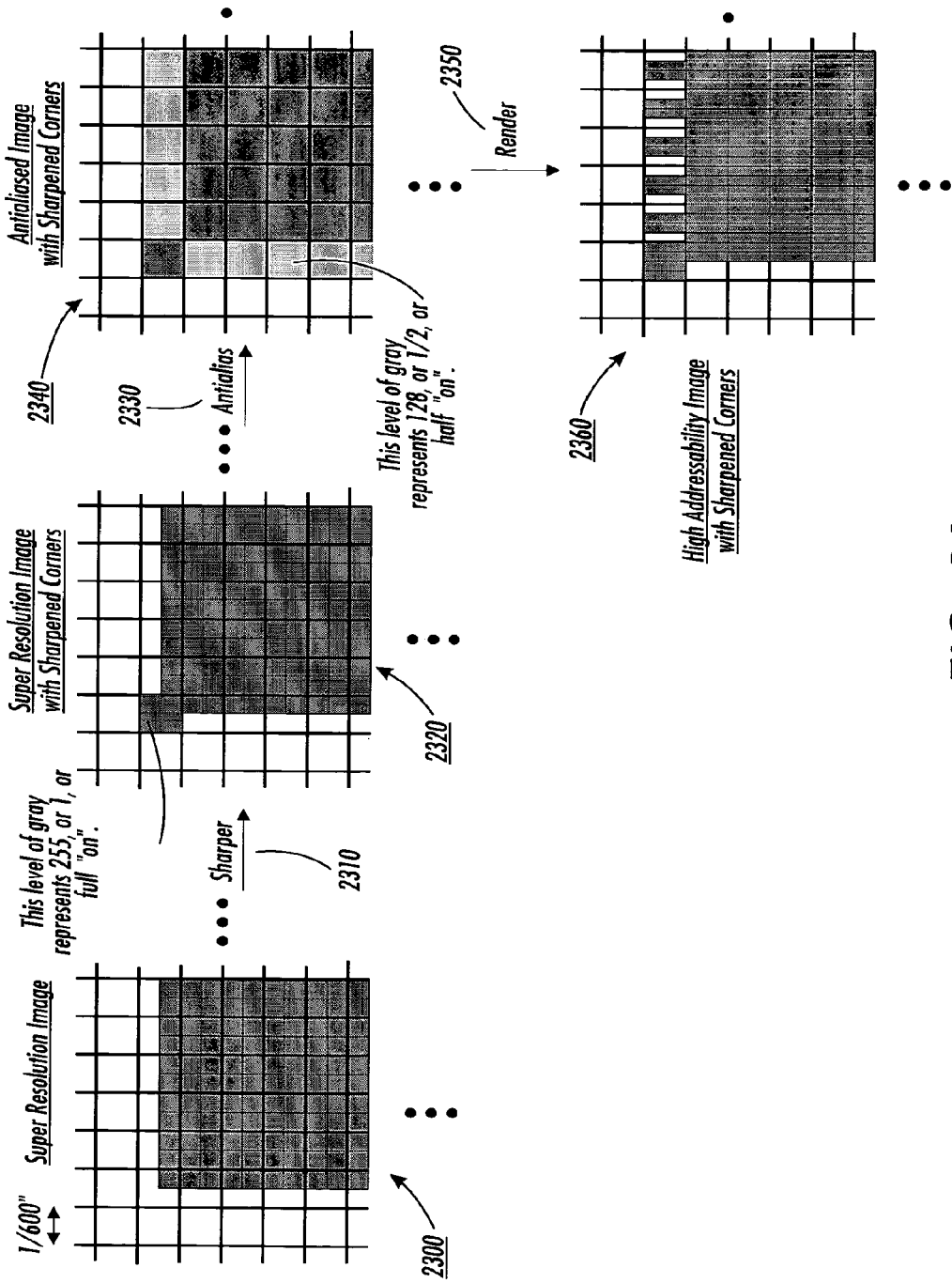
FIG. 20 shows an example bit map image at various stages in an anti-aliasing image path where the corner sharpening is performed before the anti-aliasing.
Figure 21:
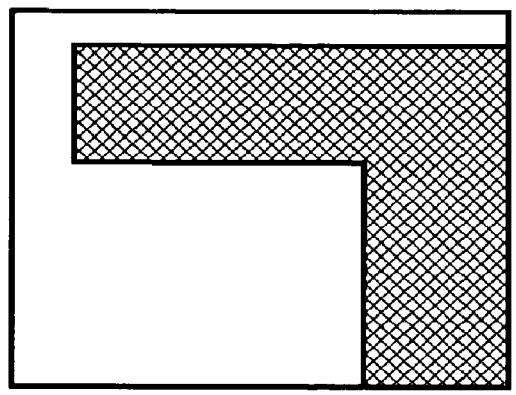
FIGS. 21, 22, and 23 depict prior art for corner sharpening.
Figure 22:
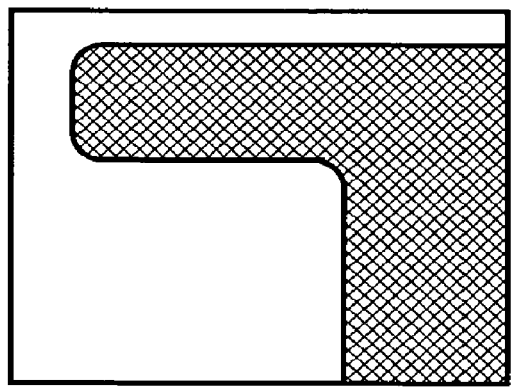

An example of an image structure processed according to an embodiment of the present invention is shown in FIG. 20. An image structure 2300 is shown rasterized to 1200 spots/inch (spi) where the output resolution of the anti-aliasing process is 600 spi. Image structure 2300 possesses pixel values of 255 for an exemplary 8 bit/pixel image path, while the background pixels possess value 0. Corner sharpening according to an embodiment of the present invention produces an image structure with an extended corner 2320. The pixels in the extended corner possess a value above that of background pixels (0), preferably 255. The filter operation 2330 produces an anti-aliased image with a sharpened corner at 600 spi 2340. The image may be further processed to produce signals that drive an imaging device, such as a laser in a laser scanning printer, drop rate in an ink jet ink drop print, or the like. The present example shows an image at 4× addressability 2350 suitable for driving a 4× laser printer. This last processing step may be referred to as Rendering 2350 and can be performed using operations such as halftoning, error diffusion or, the method to enable the recognition and rendering of antialiased images described in U.S. Pat. No. 6,167,166 and incorporated herein by reference for its teaching.

Although the embodiments above have been described as applied in a black and white system, the teachings disclosed above are intended for application in color imagery systems as well. One method would apply the matching process described above on one or more color planes within a color image representation such as cyan, magenta, yellow and black image separations. Alternatively, matching could be performed across several color planes simultaneously as described in U.S. Pat. No. 6,356,654, "SYSTEMS AND METHODS FOR TEMPLATE MATCHING OF MULTI-COLORED IMAGES", to R. Loce, M. Cianciosi, and Ying Wei Lin. The output signal may then incorporate values from one or more color planes, rather than the simple ones and zeros of a single color plane as shown above.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A method of corner sharpening in the display of a bit-mapped digital image, comprising:
   rasterizing a digital image to produce a super resolution digital image;
   identifying pixel locations about a corner structure in the super resolution digital image;
   substituting pixel values in the identified pixel locations to achieve a clustering of the substituted pixel values about the corner structure producing a corner-enhanced digital image;
   filtering and sampling according to an anti-alias operation to said corner-enhanced image to produce an anti-aliased corner enhanced image; and,
   rendering said anti-aliased corner enhanced image.

2. The method of claim 1 wherein the step of identifying includes stepping a window across an image data and comparing the data in the window to the data in templates.

3. The method of claim 2 wherein the corner structure is an outside simple corner.

4. The method of claim 2 wherein the corner is an inside simple corner.

5. The method of claim 2 wherein the corner structure is a serif.

6. The method of claim 2 wherein the substituted pixel values is one of a group consisting of 0, 1, 128 and 255.

7. The method of claim 2 wherein the substituted pixel values have an increased grayscale value.

8. The method of claim 2 wherein the substituted pixel values have a decreased grayscale value.

9. The method of claim 1 wherein the step of identifying comprises stepping a window across the image data and applying Boolean logic and arithmetic operations to pixel values within the window.

10. The method of claim 2 wherein comparing the data in the window to the data in the templates is performed in parallel.

11. A method of corner sharpening in the display of a bitmapped digital image, comprising:
   rasterizing a digital image to produce a super resolution digital image;
   identifying pixel locations about a corner structure in the super resolution digital image;
   substituting pixel values in the identified pixel locations to achieve a clustering of the substituted pixel values about the corner structure producing a corner-enhanced digital image;
   filtering and sampling according to an anti-alias operation to said corner-enhanced image to produce an anti-aliased corner enhanced image, where the sampling produces image data samples at a lower resolution; and,
   rendering the lower resolution image data samples as suitable for driving a laser printer.

12. The method of claim 11 wherein the step of identifying includes stepping a window across the image data and comparing the data in the window to the data in templates.

13. The method of claim 12 wherein the corner structure is an outside simple corner.

14. The method of claim 12 wherein the corner is an inside simple corner.

15. The method of claim 12 wherein the corner structure is a serif.

16. The method of claim 12 wherein the substituted pixel values is one of a group consisting of 0, 1, 128 and 255.

17. The method of claim 12 wherein the substituted pixel values have an increased grayscale value.

18. The method of claim 12 wherein the substituted pixel values have a decreased grayscale value.

19. The method of claim 12 wherein comparing the data in the window to the data in the templates is performed in parallel.

20. The method of claim 11 wherein the step of identifying comprises stepping a window across the image data and applying Boolean logic and arithmetic operations to pixel values within the window.

21. The method of claim 11 where the samples suitable for driving a laser printer are high addressability pixels.

22. The method of claim 11 where the samples suitable for driving a laser printer are pulse-width modulated pixels.

* * * * *